(12) United States Patent
Jeyaseelan

(10) Patent No.: US 8,427,993 B2
(45) Date of Patent: *Apr. 23, 2013

(54) POWER MANAGEMENT FOR WIRELESS DEVICES

(75) Inventor: Jaya L. Jeyaseelan, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/983,624

(22) Filed: Jan. 3, 2011

(65) Prior Publication Data

US 2011/0096709 A1    Apr. 28, 2011

Related U.S. Application Data

(63) Continuation of application No. 11/809,801, filed on Jun. 1, 2007, now Pat. No. 7,864,720.

(51) Int. Cl.
*G08C 17/00* (2006.01)
(52) U.S. Cl.
USPC ........... 370/311; 370/310; 370/328; 370/338; 455/574; 455/343.2; 455/343.5
(58) Field of Classification Search .................. 370/311, 370/328, 310, 338; 455/334, 343.1–343.5, 455/574
See application file for complete search history.

(56) References Cited

U.S. PATENT DOCUMENTS

| 2003/0131227 A1* | 7/2003 | Gardiner et al. | 713/100 |
| 2005/0190799 A1* | 9/2005 | Coffin et al. | 370/516 |
| 2006/0043208 A1* | 3/2006 | Graham | 239/71 |

* cited by examiner

*Primary Examiner* — Patrick Edouard
*Assistant Examiner* — Ronald Eisner
(74) *Attorney, Agent, or Firm* — Caven & Aghevli LLC

(57) ABSTRACT

In some embodiments, a method to manage power in a wireless communication device, comprises in a wireless networking adaptor, changing an operational status of a wireless networking adaptor to a sleep mode and transmitting a sleep message from the wireless networking adaptor to a host driver in an electronic device coupled to the networking adaptor, in the electronic device, determining whether a sleep duration specified in the sleep message exceeds a threshold, in response to a determination that the sleep duration specified in the sleep message exceeds a threshold implementing a selective suspend operation on the electronic device, and monitoring for a wake event, and in response to a determination that the sleep duration specified in the sleep message does not exceed a threshold, flushing one or more bulk IN buffers, and monitoring for a wake event.

21 Claims, 4 Drawing Sheets

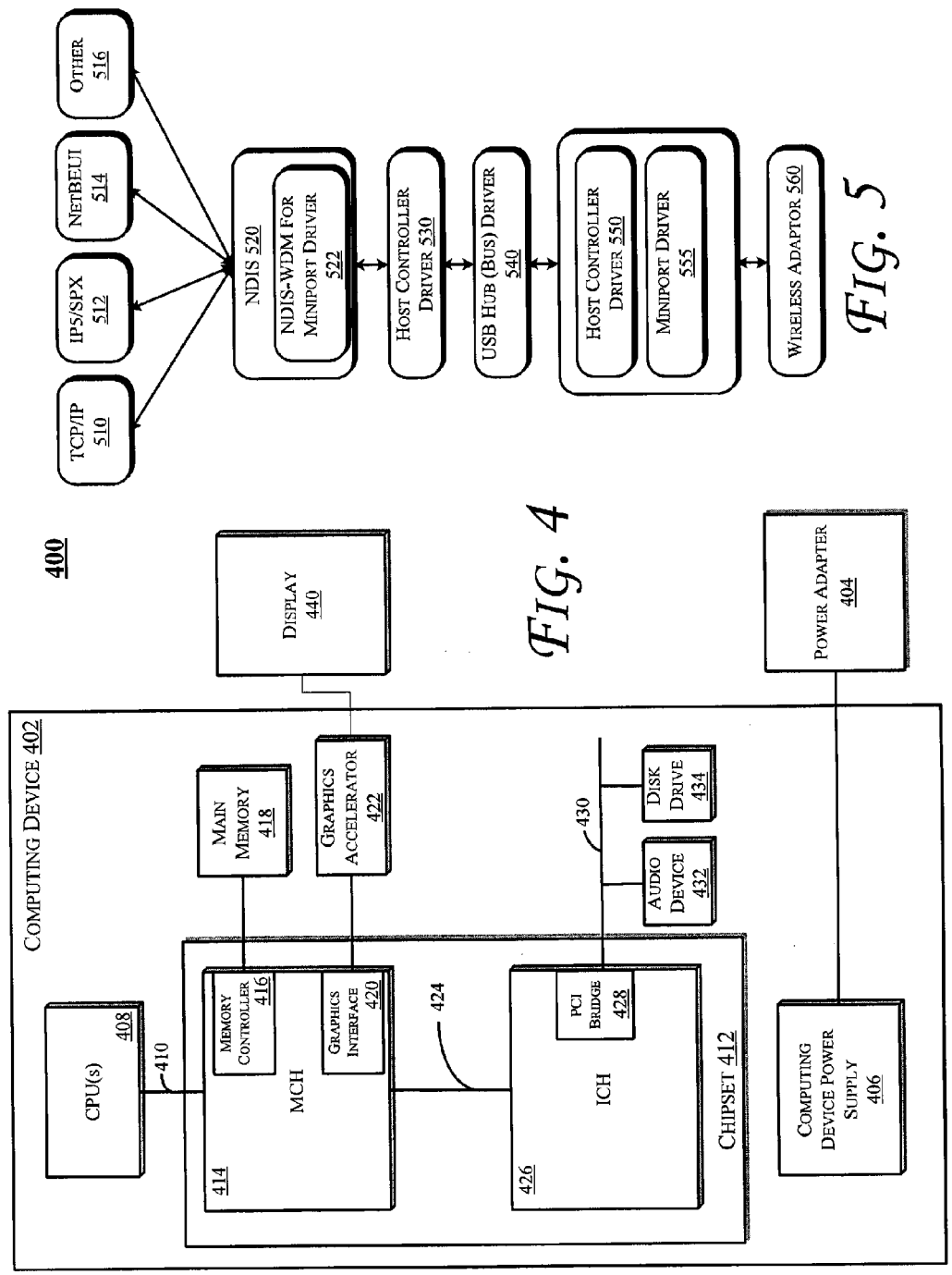

POWER MANAGEMENT FOR WIRELESS DEVICES

RELATED APPLICATIONS

This application is a continuation of copending and commonly assigned U.S. patent application Ser. No. 11/809,801 to JAYA L. JEYASEELAN, the disclosure of which is incorporated herein by reference in its entirety.

BACKGROUND

The subject matter described herein relates generally to the field of electronics and more particularly to power management for wireless devices.

Power management schemes are used in conjunction with wireless devices, e.g., to extend the battery lifetime of mobile networking devices. It is becoming increasingly common to find broadband wireless networking capabilities in mobile platform using technologies like IEEE 802.11, 802.16e, etc. In such wireless networks a wireless base station connects at least one wireless device to the network infrastructure. Wireless adaptors in mobile devices have multiple power states, e.g., transmit, receive, idle, sleep and off. In the idle mode, there is no transmit or receive but the transceiver is still on. When there is no data to transmit or receive, the wireless adaptor goes into sleep mode while being still connected to the network. In the sleep mode, the transceiver is turned off for fixed amounts of time that has been pre-negotiated with the base station or access point. During this time, data directed to the mobile device is buffered by the base station. After the sleep duration expires, the transceiver is turned on to check if the base station has buffered any data for the device. The mobile device exits sleep mode if there is buffered data, or if at any time data is to be transmitted to the base station.

In current mobile platforms, there is no notification from the wireless adaptor to the CPU host platform indicating when the adaptor is going into sleep states. This limits the availability of additional power management mechanisms on the host mobile platform.

BRIEF DESCRIPTION OF THE DRAWINGS

The detailed description is described with reference to the accompanying figures.

FIG. 4 is a schematic illustration of a computing device in which the power management scheme of FIG. 3 may be implemented, in accordance with some embodiments.

FIG. 5 is a schematic illustration of a wireless networking stack in accordance with some embodiments.

DETAILED DESCRIPTION

Described herein are exemplary systems and methods for power management for wireless devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
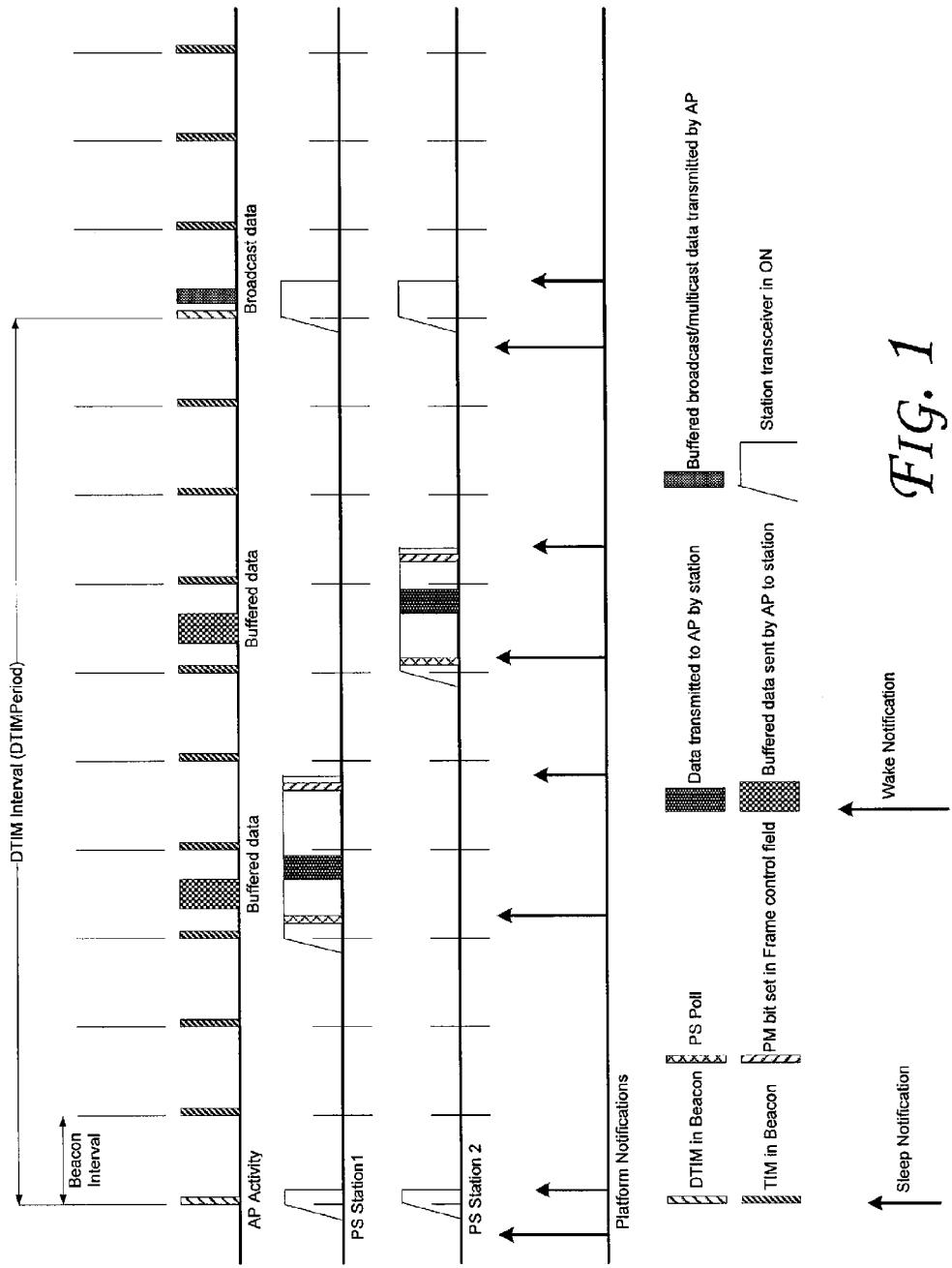
FIG. 1 is a schematic illustration of a power management scheme implemented in an 802.11 wireless networking environment.

FIG. 1 is a schematic illustration of a power management scheme implemented in an 802.11 wireless networking environment. Conventional wireless adaptors which operate in an 802.11 environment specify a listen interval which is a multiple of the beacon period (BP) when they associate with the access point (AP). When a wireless adaptor changes state into power management mode, a wireless adaptor informs the access point of the state change using a power management bit in a frame control field of frames transmitted from the wireless adaptor to the access point. In response, the access point will not transmit data to an adaptor in power-save (PS) mode, but will identify the adaptors for which data is buffered in the access point via a traffic indication map (TIM) in the beacons.

The traffic indication map may also indicate a presence of buffered broadcast or multicast data. The access point transmits a traffic indication map every beacon interval. Every DTIM (Delivery TIM) period (DTIMPeriod), a DTIM is transmitted instead of a TIM. The DTIM period in an access point can also be set to be multiples of BP for power savings. The wireless adaptor operating in a power saving mode listens for beacons periodically based on the listening interval and the media access controller's (MAC) receive DTIM parameter. In a basic service set (BSS) using the distributed coordination function (DCF), when the adaptor in power saving mode has determined that there is data buffered for it by the access point, it sends a power save poll frame to the access point, which responds with the buffered data. If any station in its BSS is in power saving mode, the access point buffers all broadcast and multicast data and delivers it to all stations immediately following the next DTIM.

Some wireless local area network (WLAN) protocols support as many as five different power saving states, each of which has a different listening interval. For example, a user can select between a protocol that maximizes battery life and a protocol that maximized performance. For example, a protocol that maximizes battery life, uses approximately 10 beacon periods as the listening interval. A beacon period may be approximately 100 milliseconds.

FIG. 1 illustrates the activity of the access point and two adaptors in power save state in a scenario where the DTIM is transmitted every 10 beacon periods. Both the adaptors turn on their receiver just before target beacon transmission time (TBTT) to receive a beacon with a DTIM to check if there is buffered multicast or broadcast data or to receive a beacon with a TIM at listen interval to check if unicast data is buffered for the adaptor.

For example, for a wireless network that operates according to an 802.11 standard, if the receiver is being turned on to receive a beacon with a DTIM, a notification is sent to the host platform that the adaptor is going out of sleep state. The notification may be sent sufficiently ahead of time of the DTIM reception such that there is sufficient time for platform components to wake up. If there is buffered broadcast or multicast data, then the notice immediately follows the beacon so the adaptor must inform the platform prior to every DTIM reception regardless of whether it is followed by buffered data or not.

If the receiver is being turned on to receive a beacon with a traffic indication map, then a notification is sent to the host platform that the adaptor is going out of sleep state after the traffic indication map is interpreted and there is data buffered by the access point for the adaptor. There may be additional delay before the host platform can process the notification and prepare itself to receive data, but the delay is acceptable because the access point does not send the data until it receives a PS-POLL message from the wireless networking adaptor. The wireless networking adaptor should send the PS-POLL message after it has received indication from the host that it is ready to receive data.

The wireless networking adaptor then sends a notification to the host platform to inform the platform that the wireless networking adaptor is changing states back to a sleep state according to its internal policies. The sleep notification includes a sleep duration parameter which allows the platform to determine a power management scheme based at least in part on the duration.

Figure 2:
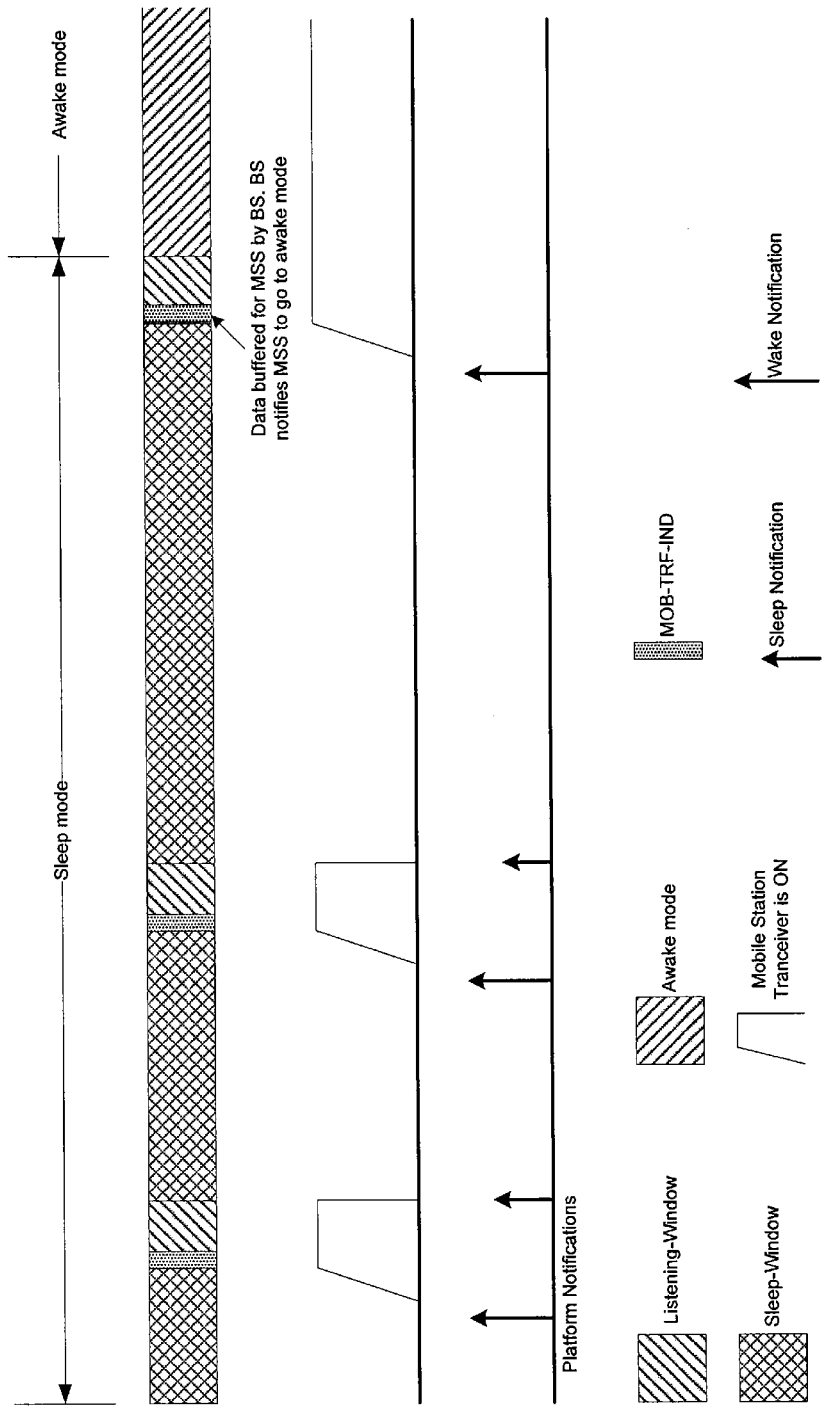
FIG. 2 is a schematic illustration of a power management scheme implemented in an 802.16e wireless networking environment.

FIG. 2 is a schematic illustration of a power management scheme which may be implemented in an 802.16e wireless networking environment. In an 802.16e sleep mode operation, the 802.16 wireless networking adaptor changes state into sleep mode for pre-negotiated fixed intervals of time and wakes up to find if the base station (BS) has any buffered downlink traffic addressed to it.

If the adaptor has data to transmit to the base station, the adaptor terminates sleep mode. The base station maintains one or more contexts (relating to different power saving class) for each station. Power saving class may be repeatedly activated and deactivated. Activation of a certain power savings class means starting sleep/listening windows sequence associated with this class. There are three types of power savings classes. Type I is for best effort (BE) and non-real-time variable rate (NRT-VR), type II is for unsolicited grant service (UGS) and real-time variable rate (RT-VR), and type III is for management operations and multicast connections. The sleep window may be determined as follows:

Type I: Sleep window=min(2*(Previous sleep window), Final sleep window)
Type II: Sleep window=Initial sleep window
Type III: Sleep window=Final sleep window (inactive after single sleep window)
Parameters for an 802.16e protocol may be as follows:
Minimum sleep interval: 2 frames
Maximum sleep interval: 1024 frames
Maximum listening interval: 64 frames
Minimum frame duration: 2 msec
Maximum frame duration: 20 msec Based on different applications and usage models, different parameters and power classes may be selected. For example, in a best efforts mode, during idle times, the adaptor may increment its sleep window from minimum to maximum and stay at maximum sleep window. To change state into sleep mode, the wireless networking adaptor sends a MOB_SLP_REQ message to the base station. The MOB_SLP_REQ contains the power saving class, initial sleep window, final sleep window and listening window. The base station responds with a MOB_SLP_RSP message containing the approved parameters. At the listening window, the adaptor will wake up and listen for the MOB_TRF_IND message from the BS, which indicates if the station should stay awake or go back to sleep mode. During listening windows the adaptor is expected to receive all downlink traffic as in the awake state.

Prior to the listening window when the mobile station turns on the transceiver, the wireless networking adaptor sends a notification to the host platform. The notification may be sent sufficiently ahead of time to allow for the platform to be fully functional for data reception. When the mobile station decides to go into sleep mode, a notification is sent to the host platform along with the sleep duration parameter.

Figure 3:
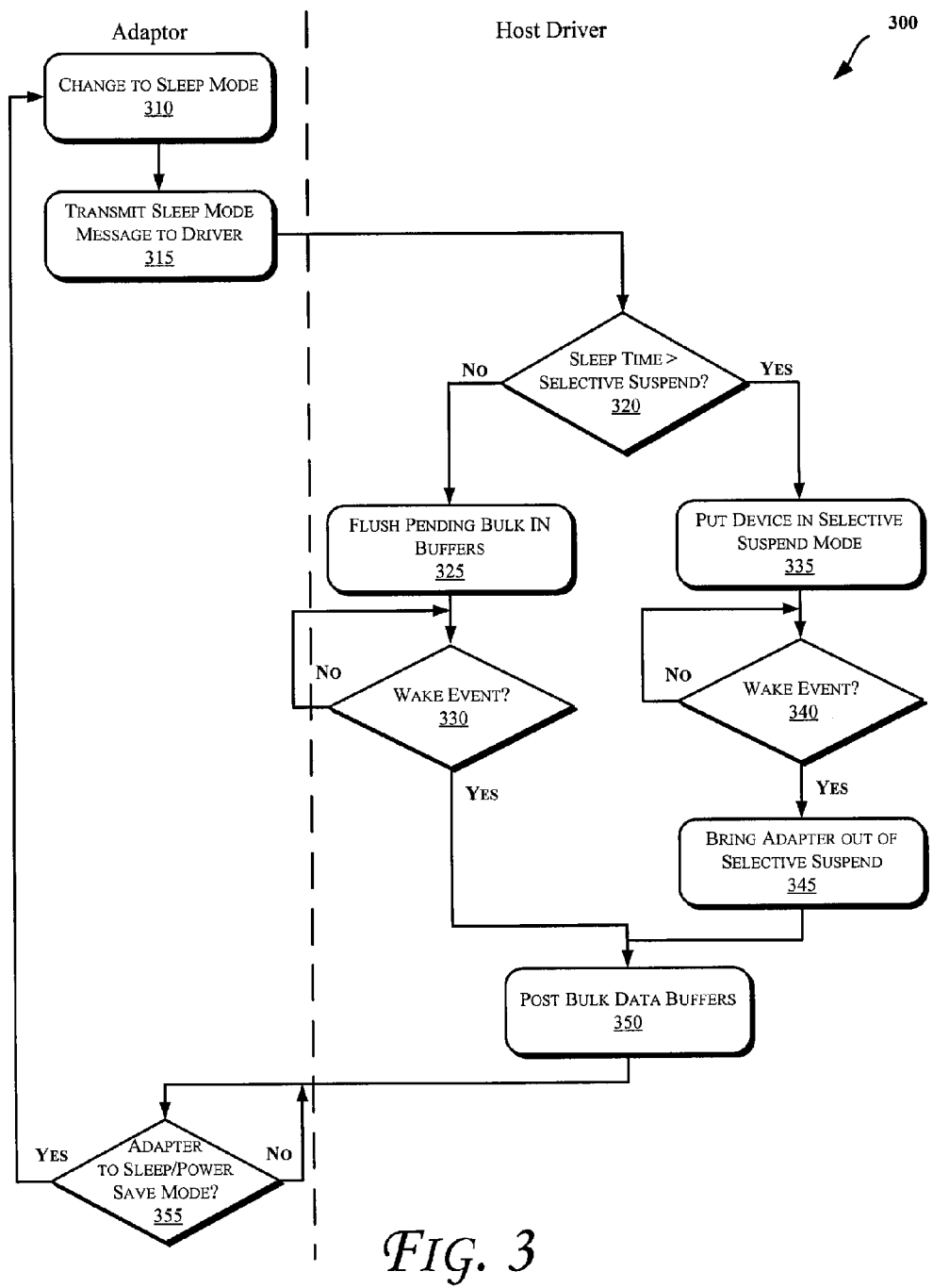
FIG. 3 is a flowchart illustrating operations in a power management scheme in accordance with some embodiments.

FIG. 3 is a flowchart illustrating operations in a power management scheme in accordance with some embodiments. Referring to FIG. 3, at operation 310 the wireless adaptor changes state to a sleep mode. At operation 315 the wireless networking adaptor transmits a sleep mode message to the host system platform, for example through the wireless network driver stack.

When the wireless networking adaptor sends a notification to the platform about going into sleep state either via the bulk IN endpoint or interrupt IN endpoint, the 802.11/802.16e platform determines how to power manage the USB link based on the duration of sleep parameter. At operation 320 it is determined whether the sleep time specified in the sleep mode message exceeds the time consumed by a selective suspend operation. A selective suspend operation on a USB bus takes about 5 milliseconds and resume takes about 30 milliseconds.

If, at operation 320, there is not enough time to implement a selective suspend mode, then control passes to operation 325 and the pending bulk IN buffers are flushed. Control then passes to operation 330 and the host driver monitors for a wake event. For example, wake events may include the expiration of the sleep duration time specified in the sleep mode message transmitted by the wireless adapter, the receipt of a message indicating that the wireless adapter has inbound messages to receive, or that there is data to be transmitted. Upon receipt of a wake event, control passes to operation 350 and one or more bulk IN data buffers are posted for data reception. In addition, one or more bulk OUT data buffers may be posted for data transmission.

By contrast, if at operation 320 there is enough time to implement a selective suspend, then control passes to operation 335 and the device is put into a selective suspend mode. Control then passes to operation 340 and the host driver monitors for a wake event. For example, wake events may include the expiration of the sleep duration time specified in the sleep mode message transmitted by the wireless adapter, the receipt of a message indicating that the wireless adapter has inbound messages to receive, or that there is data to be transmitted. Upon receipt of a wake event, control passes to operation 345 and the adapter is brought out of a selective suspend mode. At operation 350 one or more bulk IN data buffers are posted for data reception. In addition, one or more bulk OUT data buffers may be posted for data transmission. If, at operation 355 the adapter is to go to a sleep or power save mode, then control passes back to operation 310.

FIG. 4 is a schematic illustration of a computing device in which the power management scheme of FIGS. 1-3 may be implemented, in accordance with some embodiments. The computing device 402 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 402 (e.g., through a computing device power supply 406) from one or more of the following sources: one or more battery packs, an alternating current (AC) outlet (e.g., through a transformer and/or adaptor such as a power adaptor 404), automotive power supplies, airplane power supplies, and the like. In some embodiments, the power adaptor 404 may transform the power supply source output (e.g., the AC outlet voltage of about 110 VAC to 240 VAC) to a direct current (DC) voltage ranging between about 7 VDC to 12.6 VDC. Accordingly, the power adaptor 404 may be an AC/DC adaptor.

The computing device 402 may also include one or more central processing unit(s) (CPUs) 408 coupled to a bus 410. In some embodiments, the CPU 408 may be one or more processors in the Pentium® family of processors including, but not limited to, the Pentium® II processor family, Pentium® III processors, Pentium® IV processors available from Intel® Corporation of Santa Clara, Calif. Alternatively, other CPUs may be used, such as Intel's Itanium®, XEON™, and Celeron® processors, or Core™ processors. Also, one or more processors from other manufactures may be utilized. Moreover, the processors may have a single or multi core design.

A chipset 412 may be coupled to the bus 410. The chipset 412 may include a memory control hub (MCH) 414. The MCH 414 may include a memory controller 416 that is coupled to a main system memory 418. The main system memory 418 stores data and sequences of instructions that are executed by the CPU 408, or any other device included in the system 400. In some embodiments, the main system memory 418 includes random access memory (RAM); however, the main system memory 418 may be implemented using other memory types such as dynamic RAM (DRAM), synchronous DRAM (SDRAM), and the like. Additional devices may also be coupled to the bus 410, such as multiple CPUs and/or multiple system memories.

The MCH 414 may also include a graphics interface 420 coupled to a graphics accelerator 422. In some embodiments, the graphics interface 420 is coupled to the graphics accelerator 422 via an accelerated graphics port (AGP). In some embodiments, a display (such as a flat panel display) 440 may be coupled to the graphics interface 420 through, for example, a signal converter that translates a digital representation of an image stored in a storage device such as video memory or system memory into display signals that are interpreted and displayed by the display. The display 440 signals produced by the display device may pass through various control devices before being interpreted by and subsequently displayed on the display.

A hub interface 424 couples the MCH 414 to an input/output control hub (ICH) 426. The ICH 426 provides an interface to input/output (I/O) devices coupled to the computer system 400. The ICH 426 may be coupled to a peripheral component interconnect (PCI) bus. Hence, the ICH 426 includes a PCI bridge 428 that provides an interface to a PCI bus 430. The PCI bridge 428 provides a data path between the CPU 408 and peripheral devices. Additionally, other types of I/O interconnect topologies may be utilized such as the PCI Express™ architecture, available through Intel® Corporation of Santa Clara, Calif.

The PCI bus 430 may be coupled to an audio device 432 and one or more disk drive(s) 434. Other devices may be coupled to the PCI bus 430. In addition, the CPU 408 and the MCH 414 may be combined to form a single chip. Furthermore, the graphics accelerator 422 may be included within the MCH 414 in other embodiments.

Additionally, other peripherals coupled to the ICH 426 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 402 may include volatile and/or nonvolatile memory.

FIG. 5 is a schematic illustration of a wireless networking stack in accordance with some embodiments. Referring to FIG. 5, the wireless networking stack may receive input from one or more networking protocol modules such as, e.g., a TCP/IP module 510, an IPS/SPX module 512, a NetBEUI module 514, or another module 516. The inputs are directed to a Network Driver Interface Specification (NDIS) module 520, which may include a Windows Driver Model (WDM) for a miniport driver 522. The stack may further include a host controller driver 530, a USB hub (bus) driver 540, and a packaged controller driver 550 and miniport driver 555. The stack may be coupled to a wireless adaptor 560, e.g., via a USB port.

In some embodiments, the operations of FIG. 3 may be implemented as logic instructions stored on a computer-readable medium such as, e.g., the memory 418 of computer system 400 depicted in FIG. 4, or in the as a component of the protocol stack depicted in FIG. 5. The logic instructions, when executed by a processor, configure the processor to perform the operations described in FIG. 3. Hence, the memory modules and processor constitute structure for performing the operations. In some embodiments the logic instructions may be configured into a programmable device such as, for example, a field programmable gate array (FPGA), or reduced to hard-wired logic circuitry.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
one or more processors;
a wireless networking driver stack to couple a wireless networking adaptor to the apparatus;
logic to:
receive, in the wireless networking driver stack, a sleep message from the wireless networking adaptor, wherein the sleep message specifies a sleep duration;
in response to a determination that the sleep duration specified in the sleep message exceeds a threshold, implement a selective suspend operation on the electronic device, and monitoring for a wake event; and
in response to a determination that the sleep duration specified in the sleep message does not exceed a threshold, flush one or more bulk IN buffers, and monitoring for a wake event.

2. The apparatus of claim 1, further comprising logic to determine whether a sleep duration specified in the sleep message exceeds a threshold comprises comparing a sleep duration to a selective suspend time period.

3. The apparatus of claim 1, further comprising logic to monitor for at least one of:
an expiration of a sleep duration period;

a remote wakeup message from the wireless networking adaptor; and a signal indicating that a data transfer operation is pending.

4. The apparatus of claim 1, further comprising logic to change the operational status of the wireless networking adaptor from a selective suspend status to an operational status.

5. The apparatus of claim 1, further comprising logic to post at least one bulk IN data buffer for data reception.

6. The apparatus of claim 1, further comprising logic to post at least one bulk OUT data buffer for data transmission.

7. The apparatus of claim 1, further comprising logic to monitor the network adaptor status for a subsequent sleep cycle.

8. A method, comprising:
receiving, in an electronic device, a sleep message from a wireless networking adaptor coupled to the electronic device, wherein the sleep message specifies a sleep duration;

in response to a determination that the steep duration specified in the sleep message exceeds a threshold, implementing a selective suspend operation on the electronic device, and monitoring for a wake event; and in response to a determination that the sleep duration specified in the sleep message does not exceed the threshold, flushing one or more bulk IN buffers, and monitoring for a wake event.

9. The method of claim 8, further comprising comparing a sleep duration to a selective suspend time period.

10. The method of claim 8, wherein monitoring for a wake event comprises monitoring for at least one of:
an expiration of a sleep duration period;
a remote wakeup message from the wireless networking adaptor; and
a signal indicating that a data transfer operation is pending.

11. The method of claim 10, further comprising:
changing the operational status of the wireless networking adaptor from a selective suspend status to an operational status.

12. The method of claim 11, further comprising posting at least one bulk IN data buffer for data reception.

13. The method of claim 12, further comprising posting at least one bulk OUT data buffer for data transmission.

14. The method of claim 13, further comprising monitoring the network adaptor status for a subsequent sleep cycle.

15. An article comprising logic instructions stored on a non-transitory computer readable medium which, when executed on a processor on an electronic device, configure the processor to:

receive, in a wireless networking driver stack, a sleep message from a wireless networking adaptor, wherein the sleep message specifies a sleep duration;

in response to a determination that the sleep duration specified in the sleep message exceeds a threshold, implement a selective suspend operation on the electronic device, and monitor for a wake event; and in response to a determination that the sleep duration specified in the sleep message does not exceed a threshold, flush one or more bulk IN butlers, and monitoring for a wake event.

16. The article of claim 15, further comprising logic instructions stored on a tangible computer readable medium which, when executed on a processor on an electronic device, configure the processor to determine whether a sleep duration specified in the sleep message exceeds a threshold comprises comparing a sleep duration to a selective suspend time period.

17. The article of claim 15, further comprising logic instructions stored on a tangible computer readable medium which, when executed on a processor on an electronic device, configure the processor to monitor for at least one of:
an expiration of a sleep duration period;
a remote wakeup message from the wireless networking adaptor; and
a signal indicating that a data transfer operation is pending.

18. The article of claim 15, further comprising logic instructions stored on a tangible computer readable medium which, when executed on a processor on an electronic device, configure the processor to change the operational status of the wireless networking adaptor from a selective suspend status to an operational status.

19. The article of claim 15, further comprising logic instructions stored on a tangible computer readable medium which, when executed on a processor on an electronic device, configure the processor to post at least one bulk IN data buffer for data reception.

20. The article of claim 15, further comprising logic instructions stored on a tangible computer readable medium which, when executed on a processor on an electronic device, configure the processor to post at least one bulk OUT data buffer for data transmission.

21. The article of claim 15, further comprising logic instructions stored on a tangible computer readable medium which, when executed on a processor on an electronic device, configure the processor to monitor the network adaptor status for a subsequent sleep cycle.

* * * * *

UNITED STATES PATENT AND TRADEMARK OFFICE
CERTIFICATE OF CORRECTION

PATENT NO. : 8,427,993 B2
APPLICATION NO. : 12/983624
DATED : April 23, 2013
INVENTOR(S) : Jaya L. Jeyaseelan Page 1 of 1

It is certified that error appears in the above-identified patent and that said Letters Patent is hereby corrected as shown below:

In the Drawings:

On sheet 4 of 4, in Figure 5, Ref. Numeral 512, line 1, delete "IP5/SPX" and insert -- IPS/SPX --, therefor.

In the Claims:

In column 7, line 19, in claim 8, delete "steep" and insert -- sleep --, therefor.

In column 8, line 10, in claim 15, delete "butlers," and insert -- buffers, --, therefor.

Signed and Sealed this
First Day of October, 2013

Teresa Stanek Rea
*Deputy Director of the United States Patent and Trademark Office*